United States Patent [19]

Cox

[11] 4,095,346
[45] Jun. 20, 1978

[54] PIPEFITTING SQUARE

[76] Inventor: Huey Cox, 3145 William Tell St., Slidell, La. 70458

[21] Appl. No.: 750,016

[22] Filed: Dec. 13, 1976

[51] Int. Cl.² ............................................. B43L 7/00
[52] U.S. Cl. ..................................................... 33/113
[58] Field of Search ................. 33/113, 112, 111, 107, 33/75 R, 174 N

[56] References Cited

U.S. PATENT DOCUMENTS

| 172,821 | 2/1876 | Metcalf | 33/113 |
|---|---|---|---|
| 1,176,026 | 3/1916 | Boone | 33/113 |
| 1,241,976 | 10/1917 | Hill | 33/113 |
| 2,026,274 | 12/1935 | Doyle | 33/113 X |
| 2,407,368 | 9/1946 | Henjum | 33/113 |
| 3,949,481 | 4/1976 | Campbell | 33/75 R |

OTHER PUBLICATIONS

American Machinist, 8/7/50, p. 119; "Pipe Tape Shows Nominal Sizes".

*Primary Examiner*—Harry N. Maroian
*Attorney, Agent, or Firm*—Cushman, Darby & Cushman

[57] ABSTRACT

A square for use in pipefitting having a plurality of markings disposed along edges thereof, each of the markings having numeral indicia associated therewith corresponding to an actual conventional pipe size. In particular, the numeral indicia correspond to conventional pipe sizes 2, 3, 4, 5, 6, 8, 10, 12, 14, 16, 18, 20, 24, and 30. One of the square tongue edges has markings with numerical degree indicia associated therewith, each of the markings including a line disposed at a numerically indicated angle α with respect to an edge of the body, all the lines intersecting the body edge at a common apex point. The square can be utilized for a plurality of pipefitting functions, and eliminates the need for complicated calculations, the square providing for readoff of the desired values.

13 Claims, 6 Drawing Figures

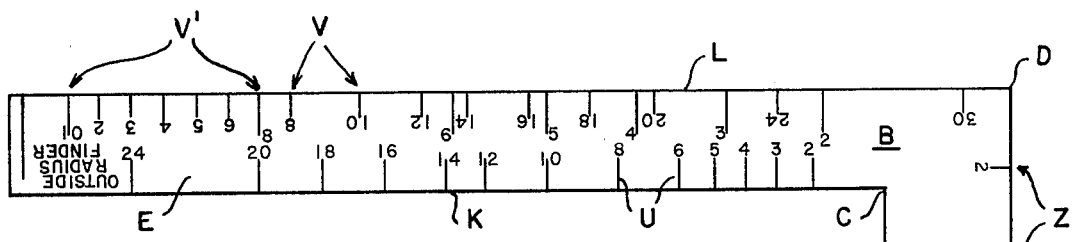
Fig. 2
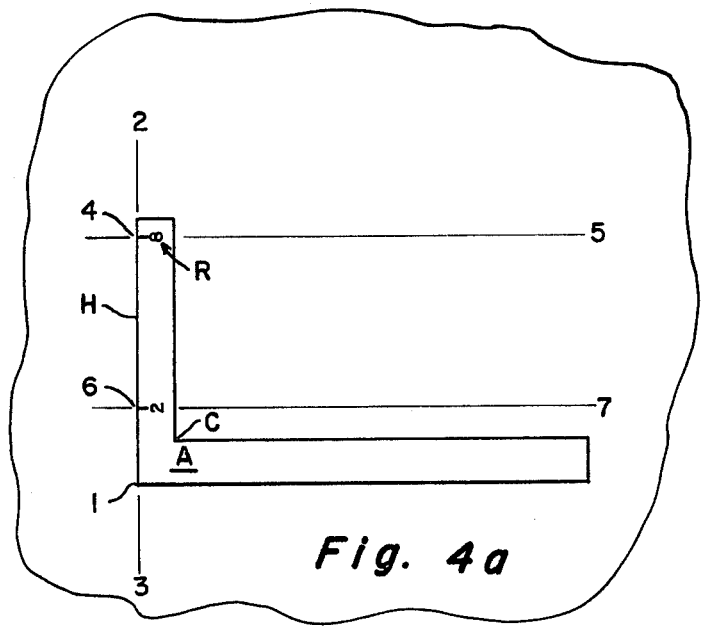
Fig. 4a
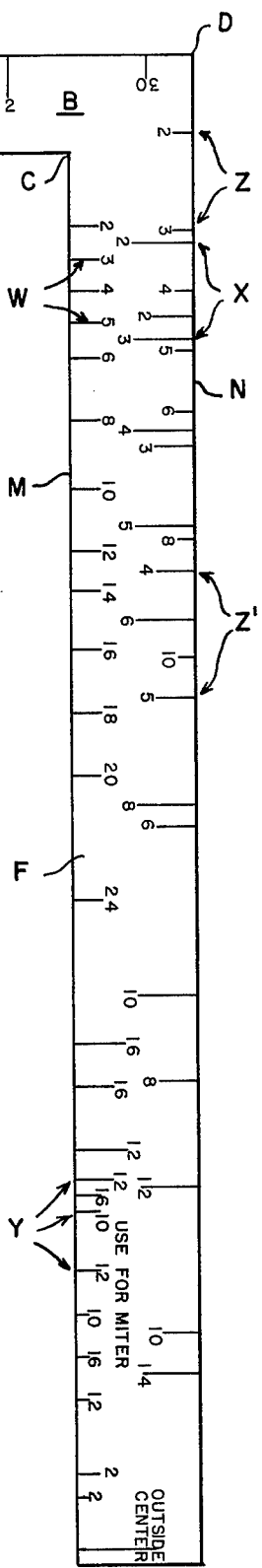
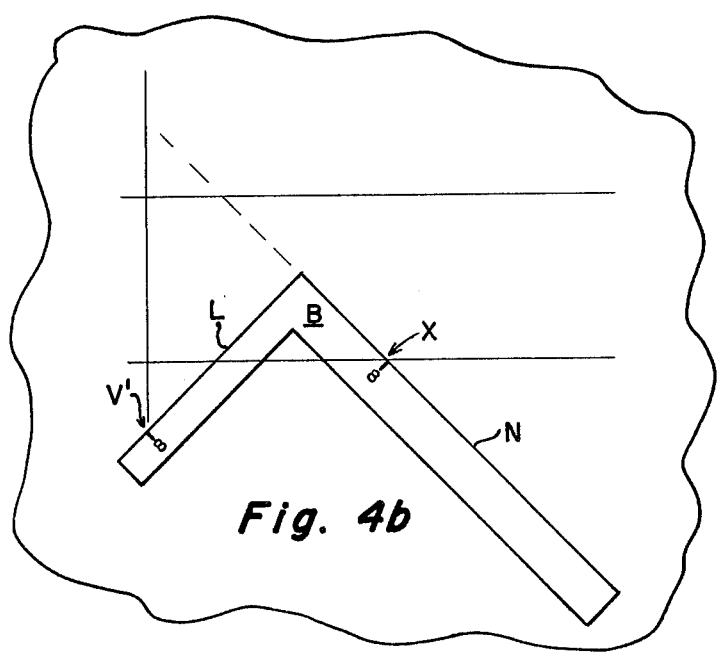
Fig. 4b

PIPEFITTING SQUARE

BACKGROUND AND SUMMARY OF THE INVENTION

At present, pipefitters use a regular carpenter's square with linear measurements for assisting them in measuring conventional pipes and elbows for cutting, fitting and the like. After taking measurements with a conventional carpenter's square with linear measurements, the pipefitter must utilize trigonometric tables, drafting board layouts, and complex calculations in order to properly setup the pipes and elbows for cutting, fitting, and the like.

According to the present invention, a square is provided — of essentially the same overall size as a carpenter's square-for assisting a pipefitter in measuring pipes for cutting and fitting that eliminates the need for trigonometric tables, drafting board work, and the complicated calculations that are inherent in present procedures. The square according to the present invention has numeral indicia thereon corresponding to actual conventional pipe sizes rather than the abstract (for the purposes of pipifitting) linear measurement quantity provided on present squares. When utilizing the square according to the present invention, a pipefitter can directly readoff on the square the pipe size he is dealing with, no extraneous linear measurements being provided. According to another aspect of the present invention, numerical degree indicia are disposed along one edge of the square and are associated with an "apex" point on an opposed inside edge of the square, to allow one to accurately draw and solve angles. By utilizing the square according to the present invention, a pipefitter can accurately draw and solve angles, find actual take-offs or center radii of long 90° elbows, find ordinates for saddle ons, find ordinates of mitered pipe, quarter the outside circumference of pipe, find the outside center of pipe, and mark an elbow to cut it on its proper axis — as well as many other related functions — without the need to resort to trigonometric tables, drafting board work, and complicated calculations.

The square according to the present invention — as is true for conventional squares — comprises a tongue and a body extending perpendicular to the tongue, the tongue and body each having inside and outside edges intersecting each other at inside and outside heels respectively, and each having a face surface and a back surface. Distinct from the squares of the prior art, according to the present invention a plurality of markings are disposed on at least one edge of the square, each of the markings having numeral indicia associated therewith corresponding to an actual conventional pipe size. According to the present invention, pipes having the following conventional sizes may readily be worked with: 2, 3, 4, 5, 6, 8, 10, 12, 14, 16, 18, 20, 24, and 30. Markings disposed along one of the square edges may comprise markings that are spaced a distance from a reference equal to the actual outside radius for the conventional numeral indicated pipe, the reference comprising a reference line indicated "outside center" and/or the square inside heel. This allows the square to be used as a center finder and for quartering pipe. Other markings may be disposed along an edge that are spaced a distance 1.5 PS from a given reference, wherein PS is the pipe size numeral indicia corresponding with the marking, the reference comprising the outside heel and/or a reference line, and allowing the pipe to be used for finding the actual take-off or center radius of a long 90° elbow. Another edge may have markings that are spaced therealong from a reference corresponding to the formula IRP × β wherein IRP is the actual inside radius for a conventional particular pipe corresponding to the numeral indicia, and wherein β is the angle formed by division of a circumference into a number of divisions $q$ so that $β = 360°/q$, such markings being used for finding ordinates for saddle ons. Additionally, one or more edges may have markings that are spaced therealong from a reference corresponding to the formula ORP × β wherein ORP is the actual outside radius for a conventional particular pipe corresponding to the numeral indicia, such markings being used for finding ordinates for mitered pipe, and for finding ordinates for saddle ons. Another set of markings may be provided along one edge, a particular numeral indicia having three sets of markings corresponding thereto, for marking an elbow for cutting on its proper axis.

According to another aspect of the present invention, for drawing and solving angles, one of the square tongue face edges has markings with numerical degree indicia associated therewith, each of the markings comprising a line disposed at a numerically indicated angle α with respect to an edge of the body face, all the lines intersecting the body face edge at a common APEX point, each of the lines being located the distance DP from a square heel wherein DP = DA × tan α, DA being the distance the common APEX point is spaced along the body edge from the same square heel from which the distance DP is measured.

It is the primary object of the present invention to provide a square for use with pipefitting that allows a pipefitter to cut and fit conventional pipe and elbows without resort to trigonometric calculations, drafting board work, complex calculations, and the like. This and other objects of the invention will become clear from an inspection of the detailed description of the invention, and from the appended claims.

BRIEF DESCRIPTION OF THE DRAWINGS

FIG. 2 is a plan view of the back of the square of FIG. 1; and

FIGS. 3–5 are schematic views of the square according to the present invention in use to perform several different tasks related to pipefitting.

DETAILED DESCRIPTION OF THE INVENTION

Figure 1:
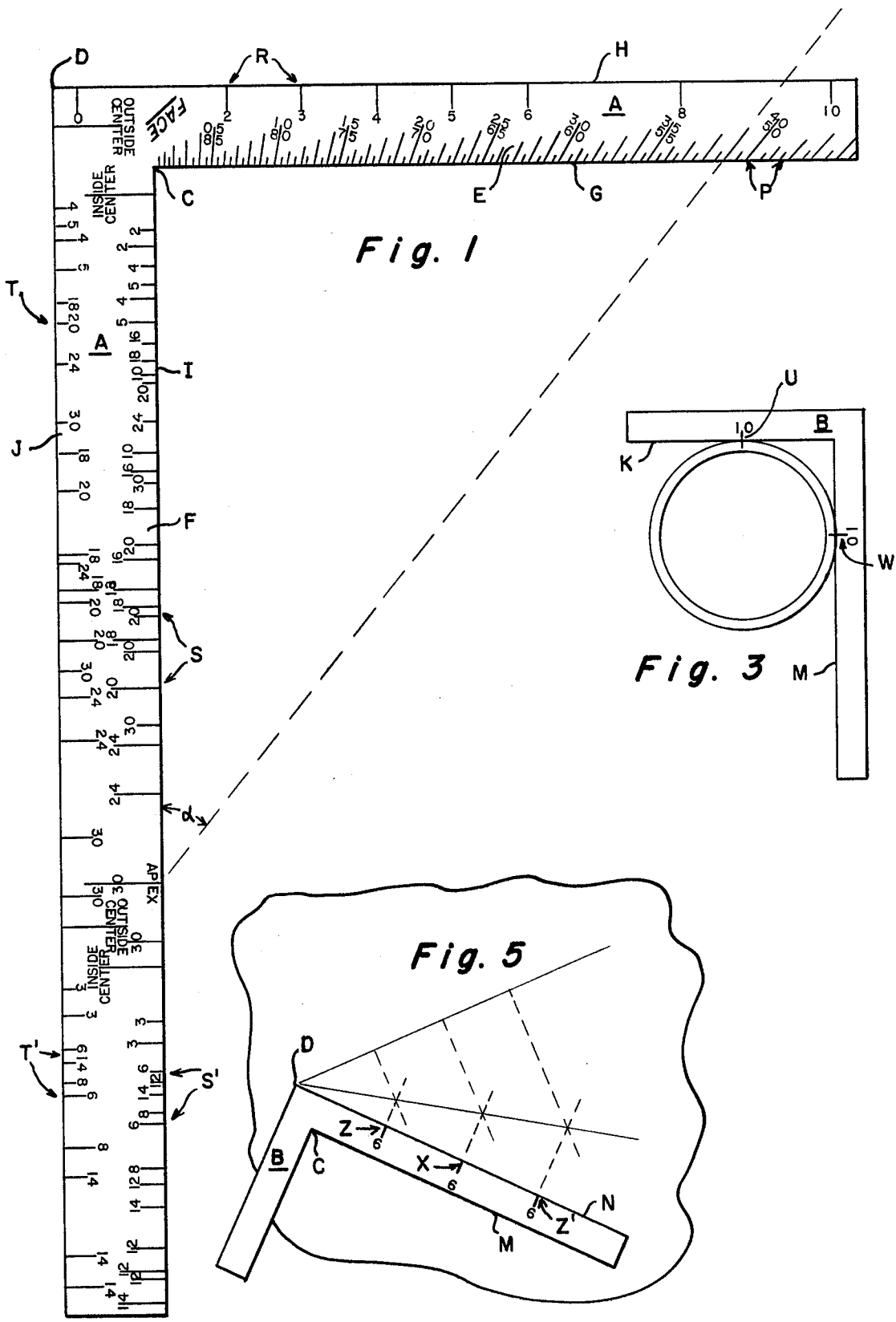
FIG. 1 is a plan view of the face of the square according to the present invention.

The invention relates to a square — in the same general form as a conventional carpenter's square — having indicia formed on various edges thereof so that the square may be utilized for performing a wide variety of tasks related to pipefitting without requiring the use of detailed calculations as is necessary in the prior art. In particular, according to the present invention, a square having actual pipe size indicia thereon is provided that allows one to accurately draw and solve angles, find actual take-offs or center radii of long 90° elbows, find ordinates for saddle ons, find ordinates of mitered pipe, quarter the outside circumference of pipe, find the outside center of a pipe, and for marking an elbow to cut it on its proper axis, as well as many other related functions.

The square according to the present invention is shown in plan view in FIGS. 1 and 2, FIG. 2 being the reverse side of FIG. 1 and vice-versa. The square has two flat planar surfaces thereof, the face A, and the back B, a tongue E (the relatively short and narrow arm of the square), a body F (the relatively long and wide arm of the square), an inside heel C (the inside intersection of the tongue E and the body F), and an outside heel D (the outside intersection of the tongue E and the body F). The tongue E has a face inside edge G, a face outside edge H, a back inside edge K, and a back outside edge L; the body F has a face inside edge I, a face outside edge J, a back inside edge M, and a back outside edge N. Each of the edges G-N has indicia markings formed thereon for use in a wide variety of functions related to pipe fitting, and the particular indicia markings that are utilized are dependent upon the particular tasks one wishes to accomplish. The indicia markings have numerals associated therewith, and with the exception of the angle solving markings (P) on the face tongue inside edge, all of the numeral markings correspond to conventional pipe sizes. While of course the variety of pipes with which the square according to the invention may be utilized may be varied depending upon the lengths of the members E, F, it is contemplated that according to the present invention the square may be utilized with conventional pipes 2, 3, 4, 5, 6, 8, 10, 12, 14, 16, 18, 20, 24 and 30 for performing a wide variety of functions with respect thereto. While the indicia markings on the square will be hereinafter described with respect to particular edges, it is noted that for some of the markings disposition on other edges is possible within the scope of the invention, some of the indicia as illustrated in the drawings merely being provided at the particular locations illustrated in order to save space and/or to provide completely clear markings. In this regard also, with a particular set of markings having the same numeral repeated in that set, the markings for the different indicia are of different lengths so that it is easy to discern by a glance which numeral is with which set, although other indicia besides relative marking line lengths could be utilized to distinguish between the set numerals (i.e., colors).

The markings P on edge G are utilized to draw and solve angles, and as illustrated in the drawings, these markings can be used to accurately draw and solve angles from 30° to 90°. Each of the markings P comprises a line disposed at its indicated angle with respect to the edge I at a point on edge I marked "APEX" (see FIG. 1). A line extending through a marking line P will intersect edge I at a given angle $\alpha$, and that angle is then indicated by a numeral above its respective marking line P. For instance, the angle $\alpha$ as shown in FIG. 1 is an angle of 39°, a line extending from the "APEX" marking on edge I making an angle of 39° with respect to edge I being coextensive with the particular marking P. The distance of each marking P from the heel C depends upon the distance the "APEX" mark is from the heel C along edge I, and in actual use for the relationships shown in FIG. 1 the "APEX" marking would be 14 inches from C. The distance a marking P (DP) is from heel C, when the "APEX" distance from C is DA, is calculated according to the following formula, where $\alpha$ is the angle to be indicated.

$$DP = DA \times \tan \alpha;$$

for $\alpha = 30°$, then, where DA = 14 inches, DP would be 8.0829 inches. As shown in the drawings, the markings P may also be of varying length for ease of recognition. For the markings actually illustrated, those indicating the halfdegrees are 0.125 inch, those indicating each whole degree of a five are 0.25 inch, those indicating 2°, 3° and 4° of a five are 0.375 inch, 0.5 inch, and 0.625 inch respectively, and those indicating each 5° are 0.75 inch. Although it is preferred that the markings P are disposed on the edge G, alternatively such markings could be disposed on the edge H and the "APEX" marking disposed on edge J, in which case the distance of each marking P from the heel D would be determined by the formula:

$$(DP + WB) = (DA + WT) \times \tan \alpha,$$

wherein WB is the width of the body F, and WT is the width of the tongue E.

The markings R on the edge H illustrated in FIG. 1 are primarily used to find actual take-offs or center radii of a long 90° elbow. In FIG. 4a the markings R are shown schematically in use for the marking off of an 8 inches long radius center at point 1 on line 2-3; lines 4-5 and 6-7 represent the offset, and point 4 is the center of the cut ell. The markings R are related to markings formed on the edges N and L in a manner to be described hereinafter. The distance of the markings R from the heel D is determined according to the following formula:

$$1.5(PS) + DO = DR, \text{ wherein}$$

PS is the pipe size (long radius 90° ell), DO is the distance of the zero mark on the edge H from heel D, and DR is the distance of the R marking corresponding to that pipe size. For the square illustrated, DO = 0.5 inch, thus for size 2 pipe, DR = 3.5 inches, for size 8, DR = 12.5 inches, etc.

There preferably are two sets of markings, S, S', on the body face inside edge I, each set of markings cooperating with an "Inside Center" marking. These markings S, S' are inside flat circumference divisions for conventional pipe, and the markings corresponding to each pipe size numeral for use in finding ordinates for saddle ons. The only reason that two sets of markings S, S' are provided instead of one is to make reading clear (so marking numerals do not interfere with each other), and to make best use of the available space. There are plurality of division lines associated with each pipe numeral, preferably two such division lines for 10 inch pipe and smaller, and four such division lines for 12 inch pipe and larger. Two such division lines for each pipe numeral make use of eight actual inside circumference divisions, while four such division lines for each pipe numeral make use of sixteen actual circumference division lines since a saddle on is the same on all quarters. The distance each marking S, S' is from the inside heel C is calculated according to the following formula:

$$(IRP \times \sin \beta) + DIC = DS \text{ (or } DS'\text{), wherein}$$

IRP is the actual inside radius of a particular pipe corresponding to the pipe numeral indicated (i.e., IRP for a 10 inch pipe is 5.01 inches, for a 14 inch pipe is 13.25 inches, etc.), $\beta$ is the angle formed by equal division of a circumference into a particular number of equal divisions, and DIC is the distance the "Inside Center" mark for the particular markings S, S' is from the inside heel C. $\beta = 360°/q$ wherein $q$ is a particular division of the circumference. When there are two division lines associated with each pipe numeral (i.e., for pipes 10 inches or less), for the first division line (a ⅛ division; $q = 8$; $360°/8 = 45°$) $\beta = 45°$, and for the second division line (a 2/8 division; $q = 4$), $\beta = 90°$, or $\sin \beta = 1$. Where there are four division lines associated with each pipe numeral (i.e., for pipes 12 inches or more), for the first division line (a 1/16 division $q = 16$) $\beta = 22.5°$, for the second line ($q = 8$) $\beta = 45°$, for the third line ($q = 16/3$) $\beta = 67.5°$, for the fourth line ($q = 4$) $\beta = 90°$. Again, all the division lines associated with a given pipe numeral can be of different lengths in order to provide clear distinction therebetween for easy reading. For the structure actually illustrated in the drawings, the first "Inside Center" mark is 0.5 inch from C, while the second "Inside Center" mark is 15.625 inches from C; the markings S, S' first division lines for all of the pipe numerals illustrated in FIG. 1 have the following distances from heel C: 2 — 1.2307981 inches; 4 — 1.9234124 inches; 5 — 2.284392 inches; 10 — 4.0426211 inches; 16 — 3,417935 inches; 18 — 3,800615 inches; 20 — 4.183295 inches; 24 — 4.948655 inches; 30 — 6.096695 inches; 3 — 16.709706 inches; 6 — 17.769311 inches; 12 — 17.92108 inches; 14 — 18.160255 inches.

The markings T, T' disposed on the body face outside edge J are utilized for finding ordinates for mitered pipe, and have flat outside circumference divisions measured from "Outside Center" marks. In general they correspond to the marks S, S' except that they are for outside centers. Again, the only reason two sets of marks are provided instead of one is for ready reading of the marks, and again a plurality of division marks corresponding to each pipe numeral may be provided. The distance each mark T, T' is from the outside heel D along edge J is calculated according to the following formula:

$$(ORP \times \sin \beta) + DOC = DT \text{ (or } DT'\text{), wherein}$$

ORP is the actual outside radius for a particular pipe corresponding to the pipe numeral indicated (i.e., for a 5 inch pipe ORP = 2.7815 inches, for a 14 inch pipe ORP = 7 inches, etc.), $\beta$ is the angle formed by division of a circumference into the number of divisions provided (see discussion with respect to $\beta$ for markings S, S' since the same applies for markings T, T'), and DOC is the distance of the "Outside Center" mark for the particular markings T, T' from the outside heel D. For the square actually illustrated in FIG. 1, the first "Outside Center" mark is 0.75 inch from D, and the second one is 16.375 inches from D, and the markings T, T' first division lines for all of the pipe numerals illustrated in FIG. 1 have the following distances from D: 4 — 2.3409975 inches; 5 — 2.7168264 inches; 18 — 4.19412 inches; 20 — 4.5768 inches; 24 — 5.34216 inches; 30 — 6.4902 inches; 3 — 17.612442 inches; 6 — 18.717301 inches; 8 — 19.424411 inches; and 14 — 19.05376 inches. The ORP numbers can be determined by the table given below.

The markings U on the tongue back inside edge K may be used as a center finder, or in conjunction with the marks W on the body back inside edge M for quartering the actual outside circumference of a pipe. The square is shown for use in quartering in FIG. 3 of the drawings for a 10 inch pipe. The distance each marking U or W from the inside heel C is calculated according to the following formula:

$$ORP = DU \text{ (or } DW\text{), wherein}$$

ORP (as for the markings T, T') is the actual outside radius for a particular pipe corresponding to the pipe numeral indicated. The following table indicates these measurements:

| PIPE SIZE | ORP = [DU or DW] |
|---|---|
| 2 | 1.1875" |
| 3 | 1.75" |
| 4 | 2.25" |
| 5 | 2.7815" |
| 6 | 3.3125" |
| 8 | 4.3125" |
| 10 | 5.375" |
| 12 | 6.375" |
| 14 | 7.0" |
| 16 | 8.0" |
| 18 | 9.0" |
| 20 | 10.0" |
| 24 | 12.0" |

The markings Y that are also disposed on the edge M do not have a direct correlation to the markings W, but rather are merely located on edge M since there is space on this edge therefor. The markings Y are flat outside circumference divisions measured from the "Outside Center" mark provided thereon, and thus they in reality correspond exactly to the markings T, T', not being provided on the same edge as the markings T, T' only to provide easy reading of the marks. A mark T, T', or Y is preferably provided for each and every pipe from size 2 all the way to size 30, and marks Y will be provided for those sizes missed on edge J. The distance of each mark Y from heel C as illustrated in the arrangement of FIG. 2 is calculated according to the formula:

$$DOC - (ORP \times \sin \beta) = DY,$$

however if the marks were rearranged so that the "Outside Center" mark were closer to heel C and the markings Y were spaced outwardly therefrom, the same formula would be used as for markings T, T'.

The tongue back outside edge L has two sets of markings associated therewith, the markings V (which are indicated as shorter than the markings V' to provide ready distinction therebetween) being used for an outside radius finder for saddle ons, and each marking V being spaced a predetermined distance from the "Outside Radius Finder" mark on edge L. Each mark V is a distance corresponding to the actual outside radius of the pipe numeral indicated from the "Outside Radius Finder" mark. Thus the markings V are spaced the same distance from the "Outside Radius Finder" mark as the markings U, W are from the heel C. For the square actually illustrated, the "Outside Radius Finder" mark is 15.75 inches from heel D, therefore the distance of each mark V from heel D is calculated according to the following formula:

$$DORF - ORP = DV, \text{ wherein}$$

DORF is the distance of the Outside Radius Finder mark from heel D, and ORP is noted in the above table with respect to markings U and W. The markings V are arranged so that they run in the opposite direction as the markings U so that outside radii can be readily determined without the necessity of manipulating the square in an awkward position.

The markings V' on edge L are spaced in the same manner as the markings X on body back outside edge N, and these two sets of markings may be utilized to provide takeoffs for center radii of long radius 90° elbows.

Markings V', X are shown for this use in FIG. 4b after marking of a radius center of particular length with the markings R, as described above with respect to FIG. 4a. It is noted that the pipe numerals associated with markings V' are "upside-down" with respect to the markings V; this is so that the markings V' can be utilized with the markings X. The markings V', X are both the same distance (for a given pipe numeral) from the heel D along their respective edges L, N. For an 8 inch pipe the center radius is 12 inches, and for a 6 inch pipe the center radius is 9 inches, thus the marks 8 and 6 are respectively 12 inches and 9 inches along the edges L, N respectively from heel D. The distance DV' or DX is calculated according to the formula 1.5 PS = DV' or DX, wherein PS is the pipe size numeral [same relative positioning as markings R].

The markings X along edge N are relatively long to distinguish them from the marking sets Z, Z' along the edge N, the markings Z, Z' also being of different length than each other. The markings X, Z, Z' are used in conjunction with each other, as illustrated in FIG. 5, to cut an elbow along its proper axis, the marks Z being the inside arc of a long radius 90° elbow and the marks Z' being the outside arc of a long radius 90° elbow, while as mentioned above the marks X are the center arc of a long radius 90° elbow. The marks Z, Z' are spaced from the heel D according to the following formulas:

$$DX - ORP = DZ; DX + ORP = DZ', \text{ wherein}$$

ORP is the actual outside radius for a particular pipe corresponding to the pipe numeral indicated (and can be determined from the above table in the U, W markings description section), and DX is the distance of the mark X from heel D.

The square according to the present invention may be made to exactly the same dimensions as conventional carpenter's squares (i.e., length of edges H, L = 16 inches, length of edges J, N = 24 inches, the tongue width WT = 1.5 inches and the body width WT = 2 inches, and given such lengths can be used with a wide variety of conventional pipes — for some functions for pipes up to size 30. The proper placement of all of the markings on the square means that many difficult calculations that were previously necessary in order to perform particular pipefitting functions are eliminated, and instead direct readoff is provided on the square. All of the markings on the square (with the exception of the angle markings) have indicia corresponding to actual pipe sizes rather than some abstract measurement quantity (i.e., inches or centimeters), and this results in the ready utilization of the square according to the present invention for a wide variety of pipefitting functions.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. A generally rigid square for use in fitting pipe of conventional size, said square comprising a tongue and a body extending perpendicular to said tongue, said tongue and body each having inside and outside edges intersecting each other at inside and outside heels respectively, and each having a face surface and a back surface, wherein the improvement comprises a plurality of markings disposed on at least one edge of said square, each of said markings having numerical indicia associated therewith corresponding to an actual conventional pipe size, and said markings being provided along a line extending from a reference on said square each marking being spaced from the reference a distance equal to the actual outside radius for the conventional numeral-indicated pipe indicated thereby.

2. A square recited in claim 1 wherein the reference is a reference line and is indicated "Outside Center", and wherein at least one of the following numeral markings are provided spaced the indicated distance from the reference line 2 — 1.1875 inches; 3 — 1.75 inches; 4 — 2.25 inches; 5 — 2.7815 inches; 6 — 3.3125 inches; 8 — 4.3125 inches; 10 — 5.375 inches; 12 — 6.375 inches; 14 — 7.0 inches; 16 — 8.0 inches; 18 — 9.0 inches; 20 — 10.0 inches; 24 — 12.0 inches.

3. A square as recited in claim 1 wherein the reference is the square inside heel and wherein two sets of said markings are provided, one set of markings being disposed along each of said tongue back inside edge and body back inside edge.

4. A square as recited in claim 1 wherein one of said square tongue face edges has markings with numerical degree indicia associated therewith, and wherein each of said markings comprises a line disposed at a numerically indicated angle $\alpha$ with respect to an edge of said body face and all said lines intersecting said body face edge at a common "APEX" point, each of said marking lines being located a distance DP from a square heel wherein DR = DA × tan $\alpha$, DA being the distance the common "APEX" point is along said body edge from the same square heel from which the distance DP is measured.

5. A generally rigid square for use in fitting pipe of conventional size, said square comprising a tongue and a body extending perpendicular to said tongue, said tongue and body each having inside and outside edges intersecting each other at inside and outside heels respectively, and each having a face surface and a back surface, wherein the improvement comprises a plurality of markings disposed on at least one edge of said square, each of said markings have numeral indicia associated therewith corresponding to an actual conventional pipe size, and comprising markings that are spaced a distance 1.5 PS from a reference on said square wherein PS is the pipe size numeral indicia corresponding with each marking.

6. A square as recited in claim 5 wherein said reference is said outside heel and wherein two sets of said markings are provided, one set of markings being disposed along each of said tongue back outside edge and said body back outside edge.

7. A square as recited in claim 6 further comprising another set of markings spaced a distance 1.5 PS from a reference line on said square, and wherein said reference line and said other set of markings are disposed along said tongue face outside edge.

8. A generally rigid square for use in fitting pipe of conventional size, said square comprising a tongue and a body extending perpendicular to said tongue, said tongue and body having inside and outside edges intersecting each other at inside and outside heels respectively, and each having a face surface and a back surface, wherein the improvement comprises a plurality of markings disposed on at least one edge of said square, each of said markings having numeral indicia associated therewith corresponding to an actual conventional pipe size, and comprising markings that are spaced along the at least one edge from a reference on said square corresponding to the formula IRP × sin $\beta$ wherein IRP is the actual inside radius for a conventional particular pipe corresponding to the numeral indicia and wherein $\beta$ is the angle formed by division of a circumference into a number of divisions $q$, so that $\beta = 360°/q$.

9. A generally rigid square for use in fitting pipe of conventional size, said square comprising a tongue and a body extending perpendicular to said tongue, said tongue and body each having inside and outside edges intersecting each other at inside and outside heels respectively, and each having a face surface and a back surface, wherein the improvement comprises a plurality of markings disposed on at least one edge of said square, each of said markings having numeral indicia associated therewith corresponding to an actual conventional pipe size, and comprising markings that are spaced along the at least one edge from a reference on said square corresponding to the formula ORP × sin $\beta$ wherein ORP is the actual outside radius for a conventional particular pipe corresponding to the numeral indicia and wherein $\beta$ is the angle formed by division of a circumference into a number of divisions $q$, so that $\beta = 360°/q$.

10. A square as recited in claim 9 wherein at least two different division lines having the same numeral indicia are provided for at least one numeral indicia, each line spaced a distance from a reference on said square determined by the formula ORP × sin $\beta$, and wherein $q$ has a different value corresponding to the different numeral indicia, at least one value of $q$ being 4, and at least one other value of $q$ being 8.

11. A square as recited in claim 10 wherein two different reference lines are provided on said square with markings spaced according to the formula ORP × sin $\beta$ therefrom, each reference line having different pipe numerals associated therewith.

12. A generally rigid square for use in fitting pipe of conventional size, said square comprising a tongue and a body extending perpendicular to said tongue, said tongue and body each having inside and outside edges intersecting each other at inside and outside heels respectively, and each having a face surface and a back surface, wherein the improvement comprises a plurality of markings disposed on at least one edge of said square, each of said markings having numeral indicia associated therewith corresponding to an actual conventional pipe size, and said markings comprising three sets of markings having the same numeral indicia associated therewith, each marking set comprising lines of different length, and wherein the distance of each marking of one set of markings X from a reference on said square is determined according to the formula DX = 1.5 PS wherein PS is the pipe size numeral indicia corresponding with that marking, and wherein the distance of each marking of the other marking sets Z, Z' from said reference is determined according to the formulas DZ − DX − ORP and DZ' − DX + ORP, wherein ORP is the actual outside radius for a conventional particular pipe corresponding to the numeral indicia.

13. A square for use in fitting pipe of conventional size, said square comprising a tongue and a body extending perpendicular to said tongue, said tongue and body each having inside and outside edges intersecting each other at inside and outside heels respectively, and each having a face surface and a back surface, wherein one of said square tongue face edges has markings with numerical degree indicia associated therewith, each of said markings comprising a line disposed at a numerically indicated angle $\alpha$ with respect to an edge of said body face, all said lines intersecting said body face edge at a common, "APEX", point, each of said lines being located a distance DP from a square heel wherein DP = DA × tan X, DA being the distance the common "APEX" point is spaced along said body edge from the same square heel from where the distance DP is measured, said square further comprising a plurality of markings disposed on each of the other edges of the square, each of said markings having numeral indicia associated therewith corresponding to an actual conventional pipe size, said tongue back inside edge and said body back inside edge having markings disposed thereon spaced from said inside heel a distance equal to the actual outside radius for the indicated conventional particular pipe numeral, said tongue face outside edge having a line with the indicia "Outside Center" disposed thereon and a plurality of markings being provided spaced along said tongue face outside edge a distance equal to the actual outside radius for the indicated conventional particular pipe numeral from said "Outside Center" line, said tongue back outside edge and said body back outside edge each having markings disposed therealong spaced a distance 1.5 PS from said outside heel wherein PS is the pipe size numeral indicia corresponding to each marking, said tongue face outside edge having a reference line with indicia "O" disposed thereon and having markings disposed therealong spaced a distance 1.5 PS from said "O" indicia, said body face inside edge having markings spaced a distance from a reference therealong according to the formula IRP × sin $\beta$, wherein IRP is the actual inside radius for a pipe size numeral corresponding to the marking, and wherein $\beta$ is the angle formed by division of a circumference into a number of divisions $q$, so that $\beta = 360°/q$, and said body face outside edge having at least one reference line thereon with indicia "Outside Center", and having markings spaced a distance from said reference line therealong according to the formula ORP × sin $\beta$, wherein ORP is the actual outside radius for a pipe size numeral corresponding to the marking.

* * * * *